United States Patent

Reinsma

[11] B 3,985,402
[45] Oct. 12, 1976

[54] CUSHIONED TRACK ROLLER FOR TRACK-TYPE VEHICLES

[75] Inventor: Harold L. Reinsma, Dunlap, Ill.

[73] Assignee: Caterpillar Tractor Co., Peoria, Ill.

[22] Filed: Sept. 16, 1974

[21] Appl. No.: 506,566

[44] Published under the second Trial Voluntary Protest Program on January 20, 1976 as document No. B 506,566.

[52] U.S. Cl. ............................. 305/27; 267/63 A
[51] Int. Cl.² .................................... B62D 55/16
[58] Field of Search .............. 305/27, 28; 180/9.5, 180/9.58, 9.6; 308/15, 26; 267/57.1 R, 57.1 A, 63 A

[56] References Cited
UNITED STATES PATENTS

| | | | |
|---|---|---|---|
| 2,952,495 | 9/1960 | Herr | 308/15 |
| 3,484,139 | 12/1969 | Danner | 305/27 |
| 3,630,581 | 12/1971 | Gostomski | 305/27 |
| 3,695,737 | 10/1972 | Alexander | 267/63 A |
| 3,777,672 | 12/1973 | Schneider | 267/63 A |
| 3,826,325 | 7/1974 | Purcell | 180/9.5 |

Primary Examiner—Philip Goodman
Assistant Examiner—John A. Carroll
Attorney, Agent, or Firm—Phillips, Moore, Weissenberger, Lempio & Strabala

[57] ABSTRACT

A track-type tractor comprises a pair of track roller frames disposed on either side thereof and an endless track entrained about each frame to engage a plurality of longitudinally spaced track rollers. Each roller is rotatably mounted on a shaft having a bracket attached on each end thereof and each bracket extends longitudinally between a pair of spaced support members secured to the frame. Retaining means, slidably supporting the ends of each bracket on the support members, cooperate with elastomeric cushioning means disposed between an outboard side of the bracket and the frame to permit slight universal movement of the bracket relative to the frame.

12 Claims, 6 Drawing Figures

CUSHIONED TRACK ROLLER FOR TRACK-TYPE VEHICLES

BACKGROUND OF THE INVENTION

Track rollers are rotatably mounted on a pair of sub-frames, mounted on either side of a track-type tractor, to support the tractor's main frame on a pair of endless track assemblies. The rollers are subjected to heavy loads during tractor operation primarily occasioned by the substantial weight of the tractor as well as its normal use over uneven and hard terrain. Such loading problems and solutions therefor are disclosed in U.S. Pat. Nos. 2,393,369; 2,775,492; 3,336,087; 3,695,737; and 3,774,708. The latter three patents are assigned to the assignee of this application.

SUMMARY OF THIS INVENTION

An object of this invention is to provide an improved durable, non-complex and economical cushioned mounting means for the track rollers of a track-type vehicle. Such cushioning means is readily adaptable to conventional track rollers with minor modification and is further adapted to be serviced expeditiously. The mounting means comprises a bracket mounted on each end of a shaft, having a track roller rotatably mounted thereon, and disposed longitudinally between a pair of members secured to the track-roller frame. A cushioning pad is disposed between each bracket and the frame to cooperate with a retaining means, supporting the lateral ends of the bracket on the frame, for permitting slight universal movement of the bracket relative to the frame.

BRIEF DESCRIPTION OF THE DRAWINGS

Other objects of this invention will become apparent from the following description and accompanying drawings wherein.

DETAILED DESCRIPTION

Figure 1:
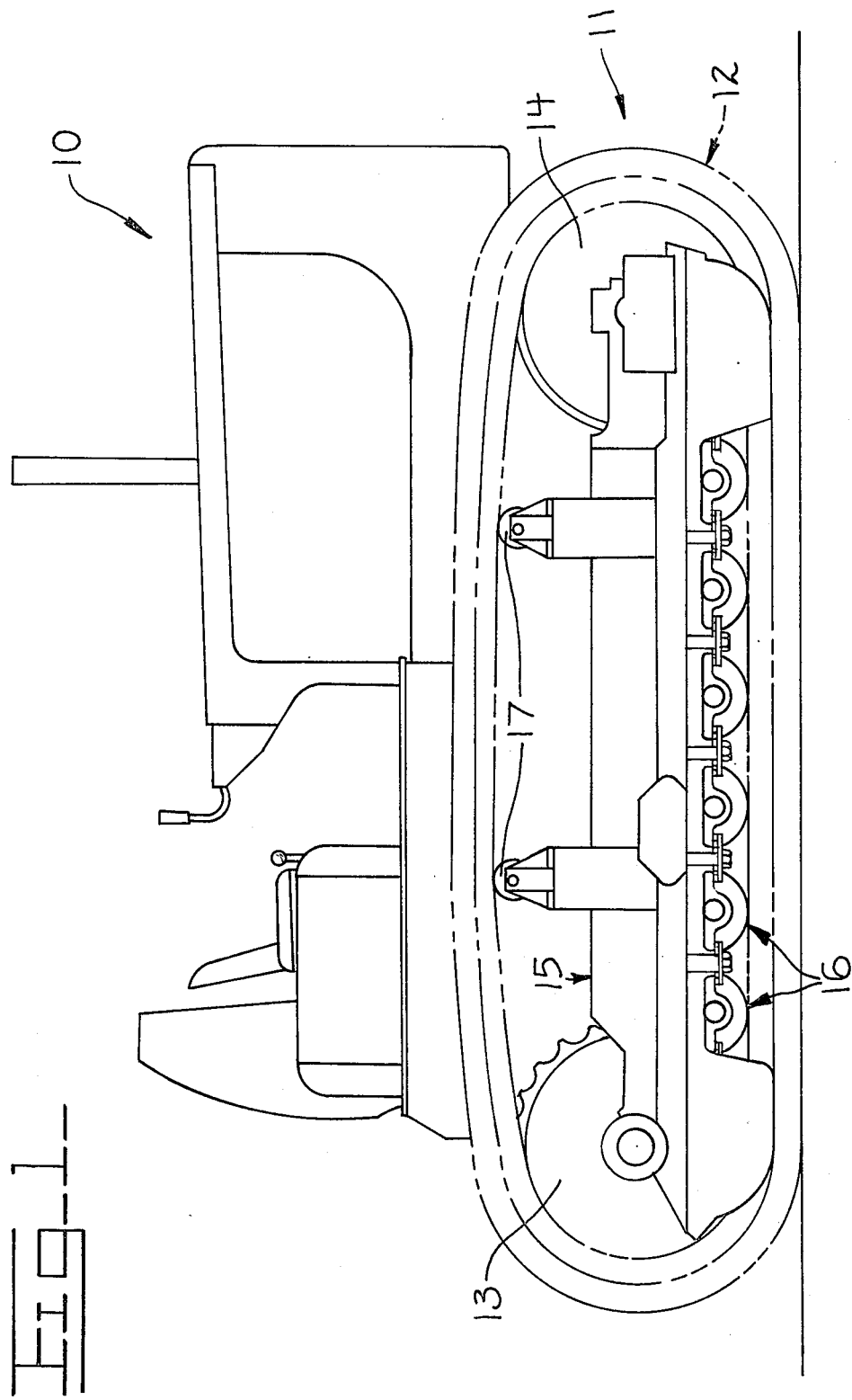
FIG. 1 is a side elevational view of a track-type tractor employing cushioned track rollers of this invention thereon.

FIG. 1 illustrates a track-type tractor 10 comprising a pair of endless track assemblies 11 (one shown) mounted on either side thereof. Each track assembly comprises an endless track 12 (shown in phantom lines) entrained about a drive sprocket 13 at its rearward end and about an idler 14 at its forward end. The drive sprocket and idler are rotatably mounted on a track roller or sub-frame 15, having a plurality of track roller assemblies 16 and a pair of carrier rollers 17 mounted thereon.

Figure 2:
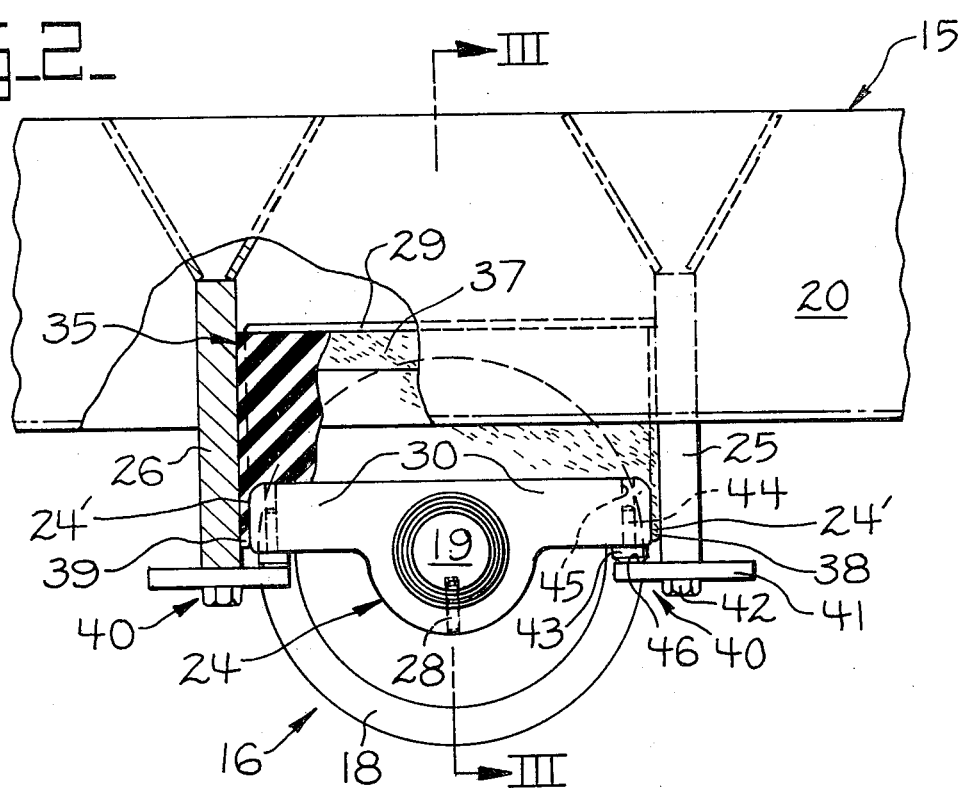
FIG. 2 is an enlarged and partially sectioned side elevational view of a track roller.
Figure 3:
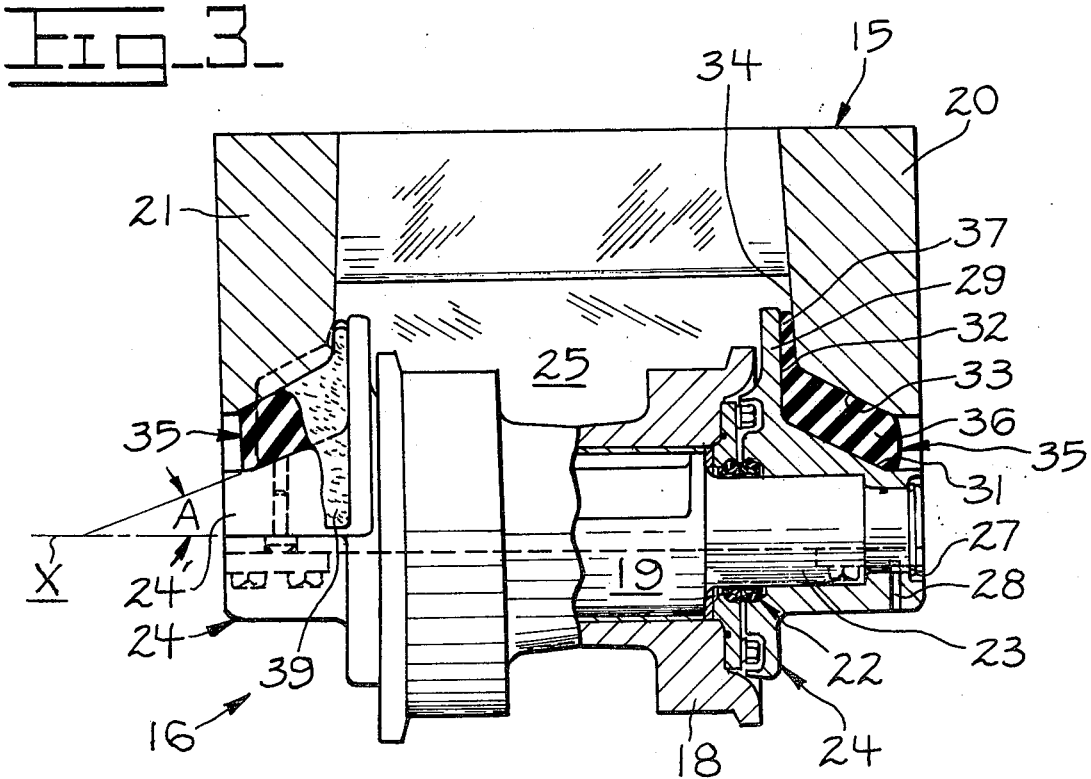
FIG. 3 is a partially sectioned front elevational view of the track roller.

Referring to FIGS. 2 and 3, each track roller assembly comprises a track roller 18 rotatably mounted in a conventional manner on a shaft 19 mounted between a pair of laterally spaced rails 20 and 21 of the sub-frame. A conventional seal assembly 22 is mounted on a reduced end portion 23 of the shaft to retain lubricant within the track roller assembly. A generally T-shaped bracket 24 is mounted on each end of the shaft and extends between and is straddled by a pair of longitudinally spaced support members 25 and 26 extending downwardly from the sub-frame and suitably secured thereto (FIG. 2). Although in the illustrated embodiment only one pair of support members is employed, it should be understood that a separate pair of support members could be employed to support each bracket.

The intermediate end cap portion of the bracket is attached to end portion 23 of the shaft by a snap ring 27 and a retaining pin 28. Referring to FIG. 2, the bracket comprises an upwardly extending flange 29 and a pair of longitudinally extending flanges 30 disposed on either side of the shaft. A tapered surface 31 is formed on an outboard side of the bracket to extend inwardly and upwardly towards roller 18, preferably at an angle A selected from the range of from 15° to 45° with respect to an imaginary horizontally disposed plane intersecting a longitudinal axis X of shaft 19.

Surface 31 intersects a vertically disposed surface 32 also formed on the outboard side of the bracket. Surfaces 31 and 32 are preferably upwardly and outwardly converging relative to longitudinally extending surfaces 33 and 34, respectively, formed on an inboard side of rail 20. An elastomeric cushioning means or pad 35 is disposed on an outboard side of the bracket and is compressed between the above described pairs of parallel surfaces for resiliently mounting the track roller assembly on sub-frame 15.

In particular, the elastomeric pad comprises a suitably composed rubber or plastic composition, well known in the art, having a main body portion 36 disposed between surfaces 31 and 33 and an upwardly extending flange portion 37 disposed between surfaces 32 and 34. In addition, the pad is sufficiently "soft" to have a pair of end portions 38 and 39 (FIG. 2) squeezed into compressed relationship between members 25 and 26 and the respective ends 24' of bracket 24. The pad thus at least substantially encapsulates the outboard side and ends of the bracket.

A pair of identical retaining means 40 are positioned between the longitudinal ends of bracket 24 and respective members 25 and 26 to support the bracket and shaft 19 in a preselected position on the track roller frame. Each retaining means preferably comprises a retaining plate 41 secured to an underside of member 25, for example, by fastening means, such as a plurality of bolts 42. A slide bearing 43 has a pin 44 secured thereto and reciprocally mounted in a mating bore 45 formed in a respective end of bracket 24. The bearing slidably engages an upper bearing surface 46 of underlying plate 41 to cooperate with cushioning means 35 to permit slight universal movement of the bracket and shaft relative to sub-frame 15.

Figure 4:
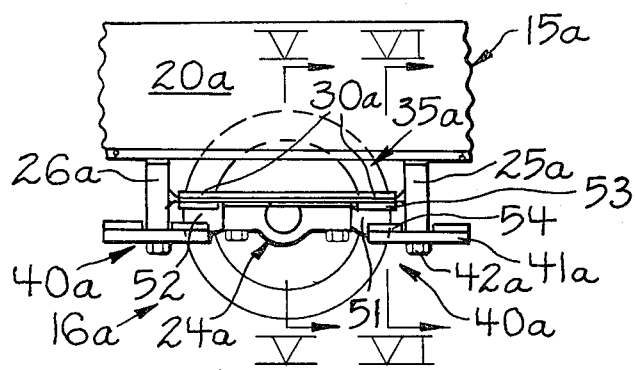
FIG. 4 is a view similar to FIG. 2, but illustrating a modified track roller.
Figure 5:
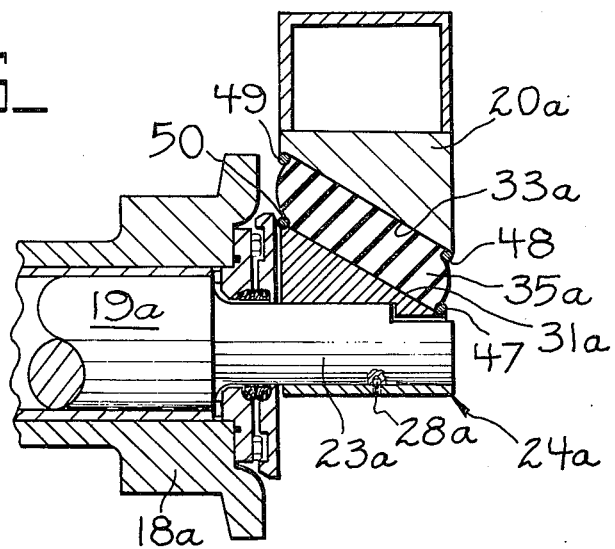
FIGS. 5 and 6 are enlarged sectional views of the FIG. 4 track roller, taken in the direction of arrows V—V and VI—VI in FIG. 4, respectively.
Figure 6:
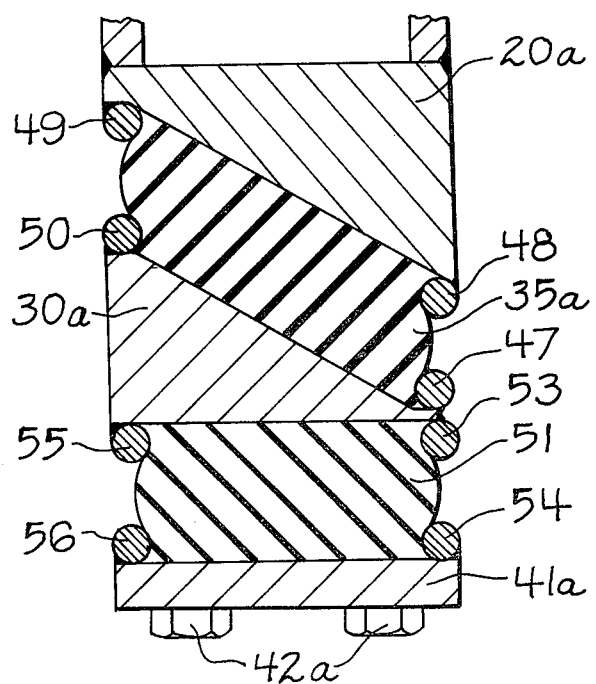

FIGS. 4–6 illustrate a modification of the FIGS. 1–3 track roller assembly wherein identical numerals depict corresponding constructions, but with the modified constructions illustrated in FIGS. 4–6 being accompanied by an *a*.

FIG. 4 partially illustrates a track roller or sub-frame 15*a* having a track roller assembly 16*a* mounted thereon. The track roller assembly also comprises a conventional track roller 18*a* rotatably mounted on a shaft 19*a* mounted between a pair of laterally spaced rails 20*a* (one shown) of the sub-frame. A generally T-shaped bracket 24*a* is mounted on a reduced end 23*a* of the shaft and extends between a pair of longitudinally spaced members 25a and 26a extending downwardly from the sub-frame and suitably secured thereto.

The intermediate end cap portion of the bracket is attached to the shaft by a retaining pin 28a. The bracket comprises a pair of longitudinally extending flanges 30a disposed on either side of the shaft. A tapered surface 31a is formed on an outboard side of the bracket to extend inwardly and upwardly in a manner similar to aforedescribed surface 31 formed on bracket 24 of the FIGS. 1–3 embodiment.

Surface 31a is disposed in parallel relationship with respect to a surface 33a formed on an inboard side of rail 20a. An elastomeric cushioning means or pad 35a is compressed between surfaces 31a and 33a and is retained therein by flanges or rods 47, 48, 49 and 50, either formed integrally with the bracket and rail or suitably secured thereto by welds or the like. A pair of similarly composed elastomeric pads 51 and 52 are disposed at either end of bracket 24a to support flanges 30a thereof. Each pad 51 and 52 forms a part of a retaining means 40a positioned between the longitudinal ends of bracket 24a and a respective member 25a or 26a to support the bracket and shaft 19a in a selected position on track roller frame 15a.

Each retaining means further comprises a retaining plate 41a secured to an underside of member 25a, for example, by a plurality of bolts 42a. As more clearly shown in FIG. 6, the outboard and inboard sides of each pad is retained in position by rods or flanges 53, 54, 55 and 56 suitably secured in the manner shown to flanges 30a of bracket 24a and retaining plate 41a. Bracket 24a is thus at least substantially encapsulated by elastomeric pads 35a, 51 and 52 to permit slight universal movement thereof as well as shaft 19a relative to sub-frame 15a during vehicle operation.

I claim:
1. In a track-type vehicle of the type having a pair of longitudinally extending sub-frames disposed on either side thereof and an endless track entrained about each of said sub-frames to engage a plurality of longitudinally spaced rollers, each rotatably mounted on a shaft secured to a respective sub-frame, the improvement wherein each end of said shaft is mounted in cushioned mounting means comprising
a pair of longitudinally spaced support members secured to each sub-frame to extend downwardly thereon in straddling relationship with respect to each end of said shaft,
a bracket mounted on each end of said shaft and extending longitudinally between said support members,
elastomeric cushioning means disposed axially between an outboard side of each of said brackets and said sub-frame, and retaining means supporting ends of said bracket on said support members and cooperating with said cushioning means for permitting slight universal movement of said bracket relative to said sub-frame.

2. The vehicle of claim 1 wherein said elastomeric cushioning means comprises a pad of elastomeric material having a main body portion compressed between a pair of at least generally parallel and opposed surfaces formed on said bracket and said sub-frame, respectively.

3. The vehicle of claim 2 wherein said surfaces extend inwardly and upwardly towards said roller at an angle selected from the range of from 15° to 45° with respect to an imaginary horizontally disposed plane intersecting a longitudinal axis of said shaft.

4. The vehicle of claim 2 wherein said bracket comprises a flange extending upwardly therefrom and said pad further comprises an integral flange portion extending upwardly from the body portion thereof and disposed between the flange portion of said bracket and said sub-frame.

5. The vehicle of claim 2 wherein said pad further comprises an integral end portion compressed between each longitudinal end of said bracket and a respective support member.

6. The vehicle of claim 1 wherein said retaining means comprises a retaining plate attached to each of said members to underlie a respective end of said bracket.

7. The vehicle of claim 6 wherein said retaining means further comprises a slide bearing mounted on each end of said bracket and slidably engaging an upper bearing surface of a respective retaining plate.

8. The vehicle of claim 7 wherein said bearing has a pin secured thereto and reciprocally mounted in a mating bore formed in a respective end of said bracket.

9. The vehicle of claim 1 further comprising flange means secured to opposite, lateral sides of said bracket and said sub-frame for preventing said cushioning means from moving therepast.

10. The vehicle of claim 6 wherein said retaining means comprises an elastomeric pad disposed on each retaining plate and further disposed longitudinally between a respective end of said bracket and a respective support member.

11. The vehicle of claim 10 wherein said bracket further comprises a pair of flanges extending longitudinally on either side thereof to each overlie a respective pad.

12. The vehicle of claim 11 further comprising flange means secured to opposite, lateral sides of each flange of said bracket and a respective one of said retaining plates for preventing said pad from moving therepast.

* * * * *